US007335311B2

(12) United States Patent
Christophersson

(10) Patent No.: US 7,335,311 B2
(45) Date of Patent: Feb. 26, 2008

(54) SLUDGE TREATMENT

(75) Inventor: Jesper Christophersson, Varberg (SE)

(73) Assignee: Nordic Water Products AB, Vastra Frolunda (SE)

( * ) Notice: Subject to any disclaimer, the term of this patent is extended or adjusted under 35 U.S.C. 154(b) by 479 days.

(21) Appl. No.: 10/962,605

(22) Filed: Oct. 13, 2004

(65) Prior Publication Data

US 2005/0092694 A1 May 5, 2005

Related U.S. Application Data

(60) Provisional application No. 60/511,106, filed on Oct. 15, 2003.

(51) Int. Cl.
*C02F 11/12* (2006.01)

(52) U.S. Cl. ...................... 210/739; 210/741; 210/769; 210/770; 210/772; 210/173; 100/45; 100/94; 100/117

(58) Field of Classification Search ..................... None
See application file for complete search history.

(56) References Cited

U.S. PATENT DOCUMENTS

| | | | | | |
|---|---|---|---|---|---|
| 351,014 | A | * | 10/1886 | Wissler | |
| 797,100 | A | * | 8/1905 | Crosby | |
| 1,780,218 | A | * | 11/1930 | Anderson | 100/145 |
| 1,906,395 | A | * | 5/1933 | Meeks | 198/608 |
| 2,153,276 | A | * | 4/1939 | Schwabach | 134/132 |
| 2,177,179 | A | * | 10/1939 | Hendershott et al. | 198/676 |
| 2,357,220 | A | * | 8/1944 | Olson | 198/608 |
| 2,364,353 | A | * | 12/1944 | Escher | 198/608 |
| 2,393,572 | A | * | 1/1946 | Soma | 198/668 |
| 2,397,758 | A | * | 4/1946 | Sharp | 100/98 R |
| 2,763,362 | A | * | 9/1956 | Greaves | 198/659 |
| 3,478,679 | A | | 11/1969 | Bauserman | |
| 3,707,224 | A | * | 12/1972 | Rastoin | 198/659 |
| 3,726,392 | A | * | 4/1973 | Rastoin | 198/659 |
| 3,765,547 | A | * | 10/1973 | Shivvers | 366/131 |
| 3,789,752 | A | | 2/1974 | Wirz | |
| 3,802,551 | A | * | 4/1974 | Somers | 198/659 |
| 3,862,594 | A | * | 1/1975 | Stolting et al. | 100/95 |
| 3,908,840 | A | * | 9/1975 | Lambert, Jr. | 414/297 |
| 4,391,561 | A | * | 7/1983 | Smith et al. | 414/218 |
| 4,446,788 | A | * | 5/1984 | Molnar | 100/117 |

(Continued)

FOREIGN PATENT DOCUMENTS

DE 10011949 11/2000

(Continued)

OTHER PUBLICATIONS

IPER of Feb. 1, 2006 for PCT/SE2004/001463; 14 pages.*

*Primary Examiner*—Robert James Popovics
(74) *Attorney, Agent, or Firm*—Young & Thompson

(57) ABSTRACT

An apparatus for treating sludge, comprises a press for dewatering the sludge, a compaction device for receiving and compacting sludge dewatered by the press, a shredder for receiving and shredding sludge compacted by the compaction device, and a tube conveyor for conveying shredded sludge from the shredder. The press is controlled to vary the flow rate of the sludge in response to at least one sensed operational parameter of the press, such as the momentary power for operating the press, pressure in the sludge in the press, sludge concentration in the press, sludge feed flow to the press or separated water flow from the press.

17 Claims, 11 Drawing Sheets

U.S. PATENT DOCUMENTS

| | | | | | |
|---|---|---|---|---|---|
| 4,498,382 | A | * | 2/1985 | Pera et al. | 100/117 |
| 4,509,419 | A | | 4/1985 | Koch et al. | |
| 4,520,724 | A | | 6/1985 | Costarelli | |
| 4,619,577 | A | * | 10/1986 | Swanson | 414/312 |
| 4,779,528 | A | * | 10/1988 | Bruke | 100/117 |
| 4,819,578 | A | * | 4/1989 | Koiso et al. | 399/360 |
| 4,824,312 | A | * | 4/1989 | Schiltz | 414/310 |
| 5,000,307 | A | * | 3/1991 | Bruke | 198/608 |
| 5,099,984 | A | * | 3/1992 | Kuzub | 198/518 |
| 5,211,841 | A | | 5/1993 | Krempp et al. | |
| 5,368,153 | A | * | 11/1994 | Bruke | 198/608 |
| 5,562,029 | A | | 10/1996 | Bruke | |
| 5,611,268 | A | | 3/1997 | Hamilton | |
| 6,357,577 | B1 | * | 3/2002 | Bruke | 198/625 |
| 6,910,882 | B2 | * | 6/2005 | Miller et al. | 432/139 |
| 2002/0050214 | A1 | | 5/2002 | Thibodeau | |
| 2005/0092694 | A1 | * | 5/2005 | Christopherson | 210/769 |

FOREIGN PATENT DOCUMENTS

WO WO 2005037532 A1 * 4/2005

* cited by examiner

Prior Art

Prior Art

Prior Art

SLUDGE TREATMENT

FIELD OF THE INVENTION

The present invention relates to an apparatus and method for treating sludge. More particularly, the invention relates to dewatering of sludge and transport of the dewatered sludge.

BACKGROUND OF THE INVENTION

Processes for treatment of polluted water normally involve a screening step, in which solids are removed by passage of the water through a screen. The removed solids, the screenings, form a wet, water-containing sludge that has to be dewatered and in many cases washed before the it can be deposited, incinerated or taken care of in another way. In order to obtain a manageable sludge that can easily be transported, deposited or incinerated it is essential that the solids content of the dewatered screenings is as high as possible. The same type of dewatering, and/or solids/liquid separation, and the same type of problems as those described below are also encountered in many industrial processes e.g. the dewatering and washing of cellulose pulp in the pulp and paper industry and in the food industry when pressing fruit juices and/or extracting oils from vegetable or animal material, but for brevity the description below will use screenings from treatment of polluted water as an example.

Sludge of screenings from municipal wastewater treatment plants normally contains cellulose fibres. Such sludge is suited for dewatering in screw presses and/or in piston presses also called ram presses. These types of presses as well as wash presses based on these press types are collectively referred to as press or presses in the following text. In the screw press the sludge is introduced into a hollow cylinder, having a water pervious wall, in which a rotating press screw compresses the sludge so that water is pressed out of the sludge and can escape through the water pervious cylinder wall. In the piston or ram press the sludge is likewise introduced into a hollow cylinder, having a water pervious wall, but here the dewatering is achieved by use of a piston that is pressed into the hollow cylinder and thus pressing water out of the sludge. The water escapes through the water pervious cylinder wall. Both screw presses and piston or ram presses are normally provided with a compaction device for the sludge, where the sludge is compacted and further water separation takes place. Such a compaction device is usually an extension of the hollow cylinder and may have either solid walls or water pervious walls and may be straight or bent.

In a so called wash press wash water is introduced into the sludge, mixed with the sludge and then removed by pressing, carrying with it fine solids that are sent back to the treatment plant for treatment together with the polluted water. This procedure can be repeated until the desired cleanness of the sludge has been obtained. In that case for each repeated wash cycle the pressure on the sludge is released, wash water is introduced and mixed with the sludge and then removed by renewed pressing According to one wash procedure the sludge is initially dewatered by pressing after which the pressure on the sludge is released, wash water is introduced and mixed with the sludge and then removed by renewed pressing. Also this procedure can be repeated until the desired cleanness of the sludge has been obtained A wash press may be either of the screw press type or the piston press type.

A conveyor tube is normally connected directly to the press for transporting the dewatered screenings to a container or deposit. Such a conveyor may be arranged to transport the dewatered screenings horizontally or at any angle to the horizontal. When dewatering sludge screenings it is desirable and of great economic value to get the sludge screenings as dry as possible after dewatering and washing/dewatering. However, current methods for obtaining a dry sludge after dewatering lead to problems in the press/conveyor system caused mainly by problems in the transportation of the sludge in the tube conveyors that are normally used in conjunction with the presses. Since dry sludge is in the form of lumps, aggregates or a hard "sausage" it causes a high friction against the conveyor tube wall, so that it might get stuck in the conveyor and cause blocking of the same. This means that to enable transport of the dewatered sludge the desired distance and at the desired angle to the horizontal, the sludge has to be kept wetter than is desirable from an economic point of view.

The problem of combining dewatering the sludge to a high dryness in presses and transporting the dewatered sludge in a tube conveyor or tube screw conveyor is well known in the industry and a number of solutions have been tried but none of the known solutions has given a satisfactory solution to the problem.

It is, for instance, well known to use conveyor tubes with widening diameters in the direction of transportation to avoid blocking by dry sludge. This will work as long as the sludge and dewatering parameters are in accordance with the design values. However it is in the nature of sludge and sludge dewatering that the properties of the sludge are variable and this will directly affect the dewatering performance of the press. Therefore, when using conveyors with widening tubes, i.e. conical tube sections, one always has to allow for these variations by setting the parameters of the dewatering press so that it will produce a wetter sludge than would be possible in order to ensure that the conveyor does not block up as the sludge load and/or the sludge characteristics in the press changes. In order to be able to operate optimally for different sludge characteristics one would need a set of conveyor tubes with different slopes of the wall of the conical section. These tube sections would have to be changed in accordance with sludge properties, which would be impractical. The solution using widening conveyor tubes will consequently produce sub-optimal results in respect of dryness of the sludge and it will also be susceptible to disturbances if an unforeseen change in the parameters should occur. In order to be on the safe side for the conveyor the dewatered sludge is normally kept much wetter than could be achieved by the press.

Another way that has been tried to solve the problem at hand is to use a tube conveyor of a type that allows variation of the slope of the conical section. In this way a certain adjustment of the tube can be carried out during operation in case the sludge characteristic and dryness after dewatering should change, but this requires constant supervision or a complicated control system. Changes cannot be made quickly enough to properly adjust to changes in load or sludge characteristics and the span of possible settings of the slope is limited. A further drawback of this system is that it can only be used for transporting the sludge a short distance and it cannot be used for lifting the sludge more than a short distance to a conveyor and/or a container. The sludge will exit from this device in the form of big lumps, which requires a conveyor screw with a big diameter for the further transport of the sludge. The reloading into a big diameter screw conveyor is costly and impractical.

Sludge dewatering by use of screw presses, piston presses and wash presses is an important operation in wastewater treatment and industrial processes. The laws and rules guiding the disposal of sludge and waste products are getting stricter all the time and there is a great need for simple methods and devices by which dried sludge that is transportable over long distances and at desired angles to the horizontal can be produced. It is a hygienic requirement that the sludge should be dewatered and transported in closed equipment and conveyors. The lay-out of wastewater treatment plants often requires closed transport of the sludge over long distances and also vertically between floors due to building constraints.

SUMMARY OF THE INVENTION

The object of the present invention is to provide an apparatus and a method that enable dewatering of sludge to a high degree of dryness in a press and transport of the dewatered sludge over considerable distances and at any inclination to the horizontal.

Accordingly, in accordance with a first aspect of the present invention, there is provided an apparatus for treating sludge, comprising a press for dewatering the sludge, a compaction device for receiving and compacting sludge dewatered by the press, a shredder for receiving and shredding sludge compacted by the compaction device, and a tube conveyor for conveying shredded sludge from the shredder.

As a result, the apparatus of the invention enables operation of a screw press, piston press or wash press in a way that makes it possible to dewater the sludge to a high degree of dryness at the same time as the dewatered sludge can also be transported in tube conveyors with or without transport screws therein over considerable distances and at any inclination to the horizontal without problems. By using operational parameters in the press to control the flow of dewatered sludge out of the press and/or the compaction device, together with the breaking up or shredding of the lumps or "sausages" of dewatered sludge, a dewatered sludge having a high dryness as well as being easily transportable over long distances and at any angle of inclination in tube conveyors and/or screw conveyors is achieved.

In accordance with a second aspect of the present invention, there is provided a method for treating sludge, comprising the steps of dewatering the sludge, compacting the dewatered sludge, using a shredder to shred the compacted sludge, transporting the shredded sludge in a closed channel from the shredder, and discharging the sludge from the channel The flow of sludge out of the press and/or the compaction device can be controlled in such a way that desired values for dewatering parameters in the press are achieved. Further by using the flow controlling means together with a break up and/or shredding means the dewatered sludge will be transportable in tube conveyors and/or tube screw conveyors over long distances and at any angle of inclination to the horizontal. Parameters that can be measured to produce a signal for controlling the flow of sludge out of the press can be e.g. the dryness of the sludge in the compaction device of the press, the momentary power consumption of the press motor and/or the torque of the drive shaft of the screw press, the piston pressure and/or the hydraulic and/or pneumatic pressure in the drive unit of the piston press, the pressure on the sludge in the press and/or the compaction device and the feed flow and/or the water flow out of the press.

For instance, by measuring the momentary power consumption of the press motor and using this value to control the flow of sludge out of the press and if desirable also the breaking up and/or shredding means it is possible to always operate the press motor near, but below, its maximum power consumption thereby making sure that the press will exert its maximum dewatering work on the sludge as well as allowing the sludge to have its maximum detention time in the press thereby achieving the driest possible sludge for the press and the load in question. This type of control will also adjust the operation of the press to variations in the feed flow as well as to changing characteristics of the feed so that the press will always produce a good dewatering. With the breaking up and/or shredding means according to the invention breaking up the dewatered sludge the resulting pieces of dewatered sludge are easily transportable in a tube conveyor and/or tube screw conveyor. These means are essential for the operation of the press according to the invention since in case the press should be operated with the described flow control but without the breaking up and/or shredding means then the dewatered sludge would plug up the tube conveyor and consequently the press. Similarly the torque of the screw in the screw press can be measured and the signal used for the type of control described above.

In an analogous way it is possible to measure the hydraulic and/or pneumatic pressure applied to the piston in the piston press and use this value for controlling the flow rate of dewatered sludge leaving the piston press and if desirable the breaking up and/shredding means.

Similarly the concentration of the dewatered sludge in the press or its compaction device can be measured and the signal be used for control of the flow of dewatered sludge leaving the press and if desirable of the breaking up and/or shredding means.

Further signals that can be used for control according to the invention are those obtained from sensors measuring the feed flow to the press, the flow of water from the press, viscosity sensors in the press and/or any suitable sensor measuring any operational parameter in the press which may be used for control.

Further, according to the invention a combination of signals from different sensors may be combined to control the press.

A time sequence controller and/or control sequence from a computer or similar may also be used alone or together with any of the control methods described above to control a press in accordance with the invention. One method is to let the time sequence controller run the press unless overruled by any of the control signals described above. One way to use the time sequence signal and/or control sequence is to dewater the sludge in batches i. e. fill the press, then a timer is started and the dewatering of the batch of sludge runs until the signal from one or more of the sensors has reached its set value and/or the timer has reached its set value, at which time the flow of sludge out of the press is started and run for a certain time or alternatively changed in accordance with the control strategy. This sequence can be repeated any number of times.

The flow control can be carried out by running the flow control means intermittently or by continuous and/or stepped changes of their settings.

According to the invention shredding or breaking up means for the dewatered sludge is provided together with the flow controlling means for the dewatered sludge so that big lumps or hard "sausages " are broken up into smaller pieces which can easily be transported over long distances in a tube conveyor with or without a transport screw therein.

There are many types of means for the flow control and shredding and/or breaking up of the sludge that can be used, for instance a valve with variable opening together with a rotating blade for breaking up and/or shredding the sludge. Another means could be a rotating cone with ridges on its surface which cone can be moved relatively to the outlet opening of the screw press, piston press or wash press forming a controlled annulus and thus obtaining the desired effect according to the invention.

A further means is to use a valve followed by the front end of a transport screw of a tube conveyor, wherein the front end of the transport screw is designed so that it will break up the sludge lumps and sausages to smaller pieces suitable for transport.

It has been found especially advantageous to control the flow of dewatered sludge out of the press and if desired the breaking up or shredding means for the dewatered sludge by using a combined means for the flow control and the breaking up and/or shredding of the dewatered sludge. Such a combined means can be a transport screw of in a tube conveyor that is directly connected to the press and/or the compaction zone of the press using signals from measuring suitable parameters in the press and/or wash press to control both the flow of dewatered sludge out of the press and the shredding and/or breaking up of the sludge lumps, aggregates or "sausages". The flow is controlled by varying the revolutions per minute of the transport screw of the tube screw conveyor. For example, the rotational speed of the transport screw may be controlled in response to at least one sensed operational parameter of the press, such as the momentary power for operating the press or the pressure, concentration or viscosity of the sludge in the press. The transport screw comprises a helically extending element having a peripheral edge, and the shredder is formed on the peripheral edge of the helical element. The shredding can thus also be controlled by controlling the revolutions per minute of the transport screw. According to the invention it is also possible to provide at least one more shredder downstream of the first shredder. Such a shredder can be arranged on the transport screw.

The above mentioned transport screw of the tube conveyor may be designed so that at stand still there will be essentially no flow of sludge out of the press. By controlling the rate of rotation of such a transport screw any desirable flow combined with breaking up or shredding of the sludge lumps or "sausages" can be easily achieved.

The upstream end of the transport screw may be provided with a centrally attached conical tip that will break up the dewatered sludge and direct it to the part of the transport screw that provides the shredding as well as provide better control and further protect the conveyor screw from overloading.

In the case that the transport screw in the tube conveyor is used in the way described above it has three functions: a) it controls the flow of dewatered sludge out of the press according to the signal originating from the measurement of parameters in the press and/or provided by a timer or predetermined time sequence, b) it breaks up lumps and/or "sausages" of sludge and c) it transports away the pieces of sludge resulting from the shredding/break up. Using this method the sludge can be dewatered to a high dryness at the same time as transportation of the dewatered sludge over long distances and at any angle of inclination is possible by use of a tube conveyor with or without a transport screw therein. The dewatered sludge will further be discharged from the tube screw conveyor in a form which is ideal for handling and incineration.

The wash process in a wash press can also be improved so that a cleaner sludge can be produced using the present invention. Cleaner sludge means lower handling, storage and disposal costs for screenings from wastewater treatment. It also means cleaner cellulose pulp and improved recovery of chemicals when the invention is used in the pulp and paper industry, which has great economic value. Recovery of chemicals from sludge in the chemical industry is another application.

Traditionally, simple tube conveyors are used, whereby the press connected to such a tube conveyor pushes the sludge cake through the tube conveyor. However, a tube conveyor provided with a transport screw therein has the advantage that it operates independently of the press, since the transport screw pulls the dewatered sludge through the tube conveyor and consequently does not use any of the power supplied for driving the press. Consequently, all power can be used for dewatering which gives a drier dewatered cake. It is true, however, that tube conveyors with transport screws that pull the sludge normally cannot be used for transporting sludge dewatered to a high dryness in a press since this sludge forms hard lumps that will not transport and discharge properly from the tube conveyor. This problem is taken care of by the method and apparatus according to this invention. In one version of the present invention at least a second disintegration or breaking up of lumps that may be formed during transportation takes place using shredder(s) along the transport screw and a further shredders may be provided at the downstream end of the tube conveyor to break up any aggregates formed. This downstream shredder may include a rotary knife working together with a stationary knife. In this way both a trouble free transportation by the transport screw in the tube conveyor and a trouble free discharge from the tube conveyor is achieved for a wide range of conditions.

BRIEF DESCRIPTION OF DRAWINGS

Referring to the drawing figures, like reference numerals designate identical or corresponding elements throughout the several figures.

DETAILED DESCRIPTION OF EMBODIMENTS

Figure 1:
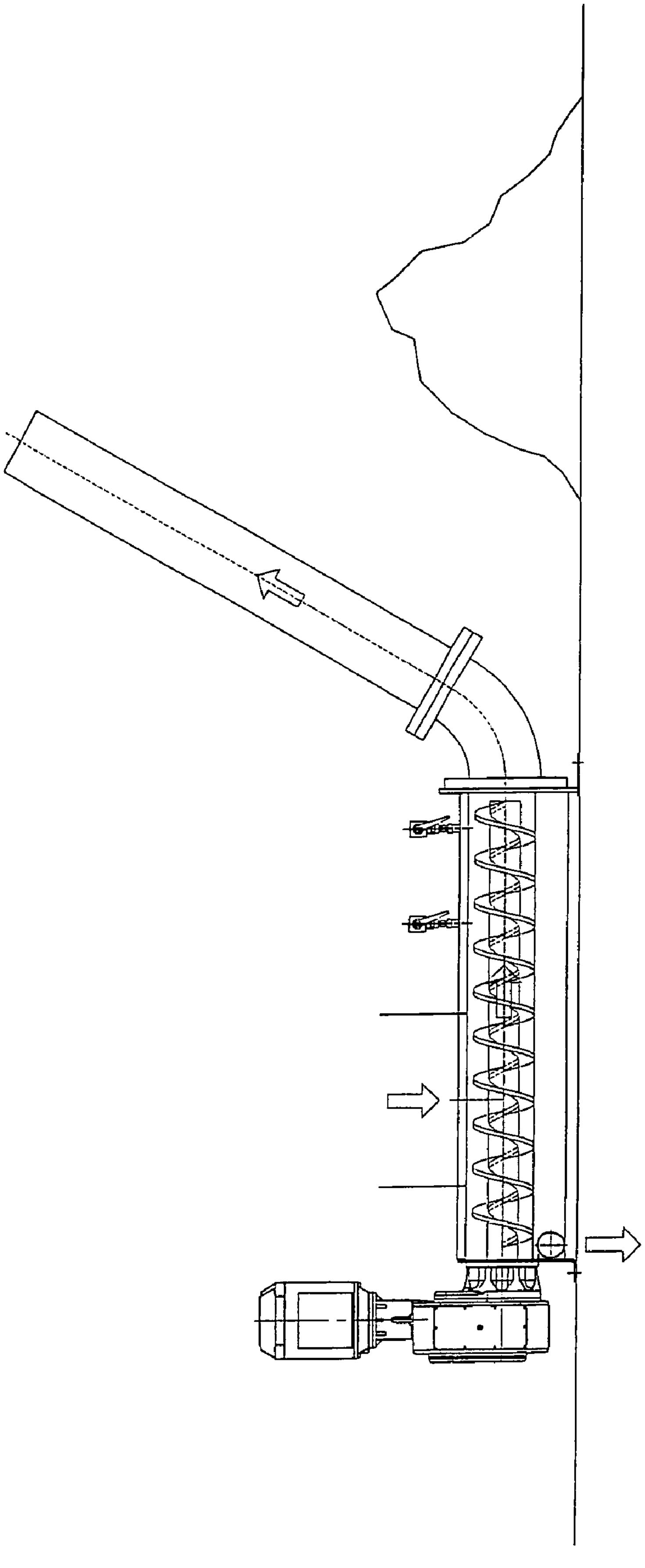
FIGS. 1, 2 and 3 show apparatuses according to prior art.
Figure 2:
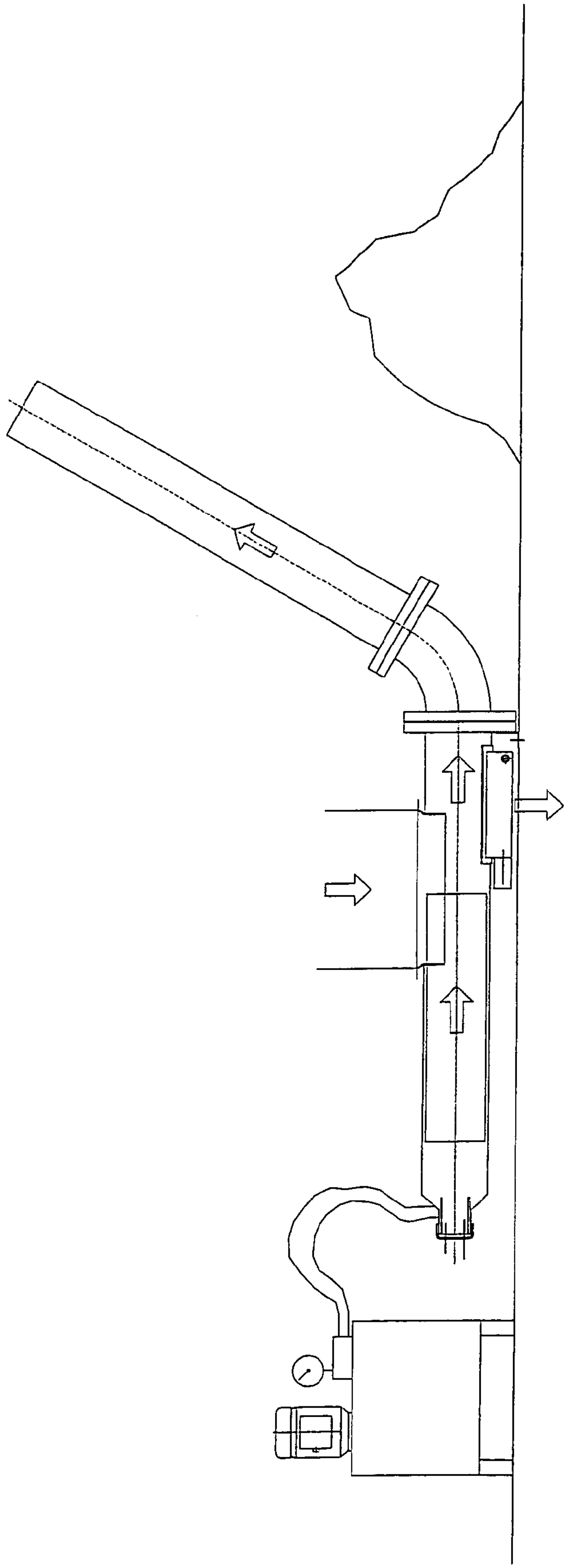
Figure 3:
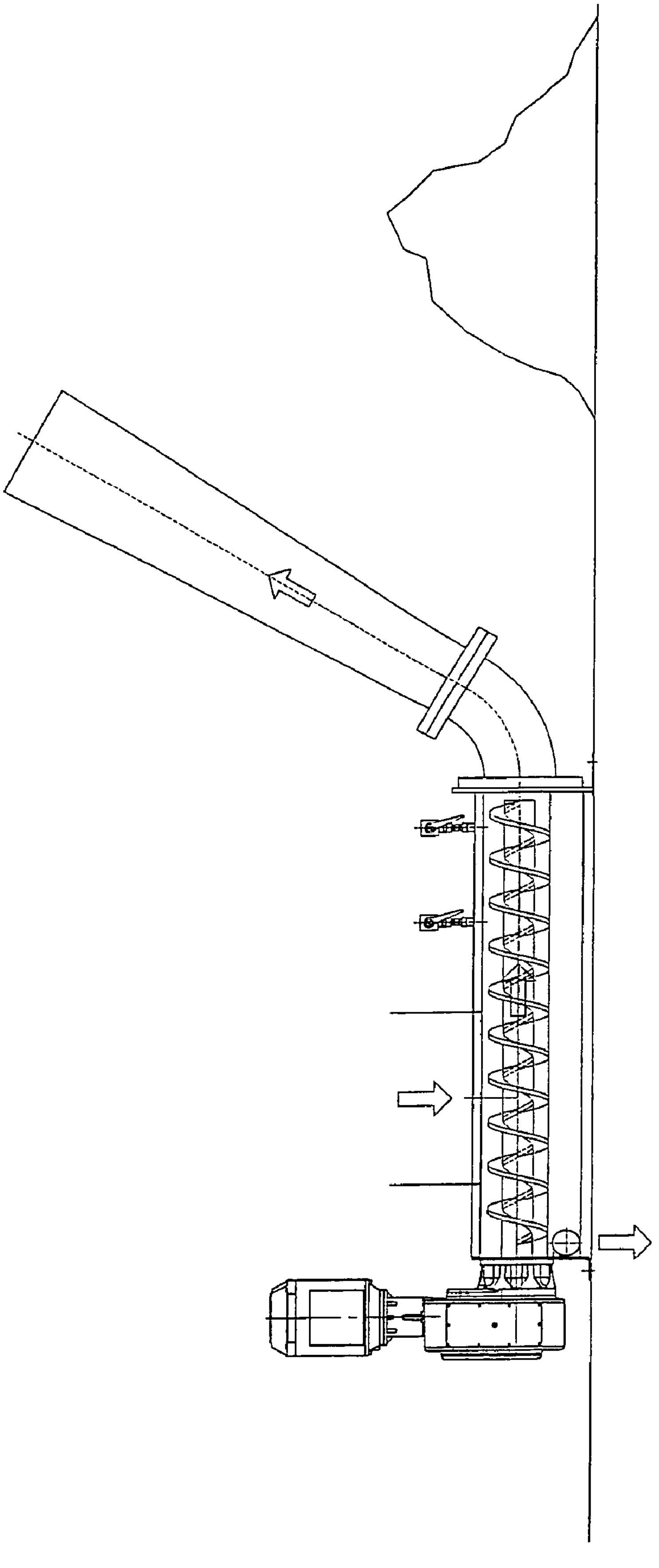

FIGS. 1, 2 and 3 show apparatuses according to prior art. Accordingly, FIG. 1 shows a conventional screw press/screw wash press for sludge dewatering including a compaction device and followed by a tube conveyor for transporting dewatered sludge. FIG. 2 shows a conventional piston press for sludge dewatering including a compaction device and followed by a tube conveyor. FIG. 3 shows a modified conventional screw press/screw wash press for sludge dewatering including a compaction device and followed by a tube conveyor for transporting dewatered sludge having a conveying tube with widening diameter in the direction of transport in order to avoid blocking by dry sludge.

Embodiments of the present invention will now be explained in detail with reference to FIGS. 4 to 11.

Figure 4:
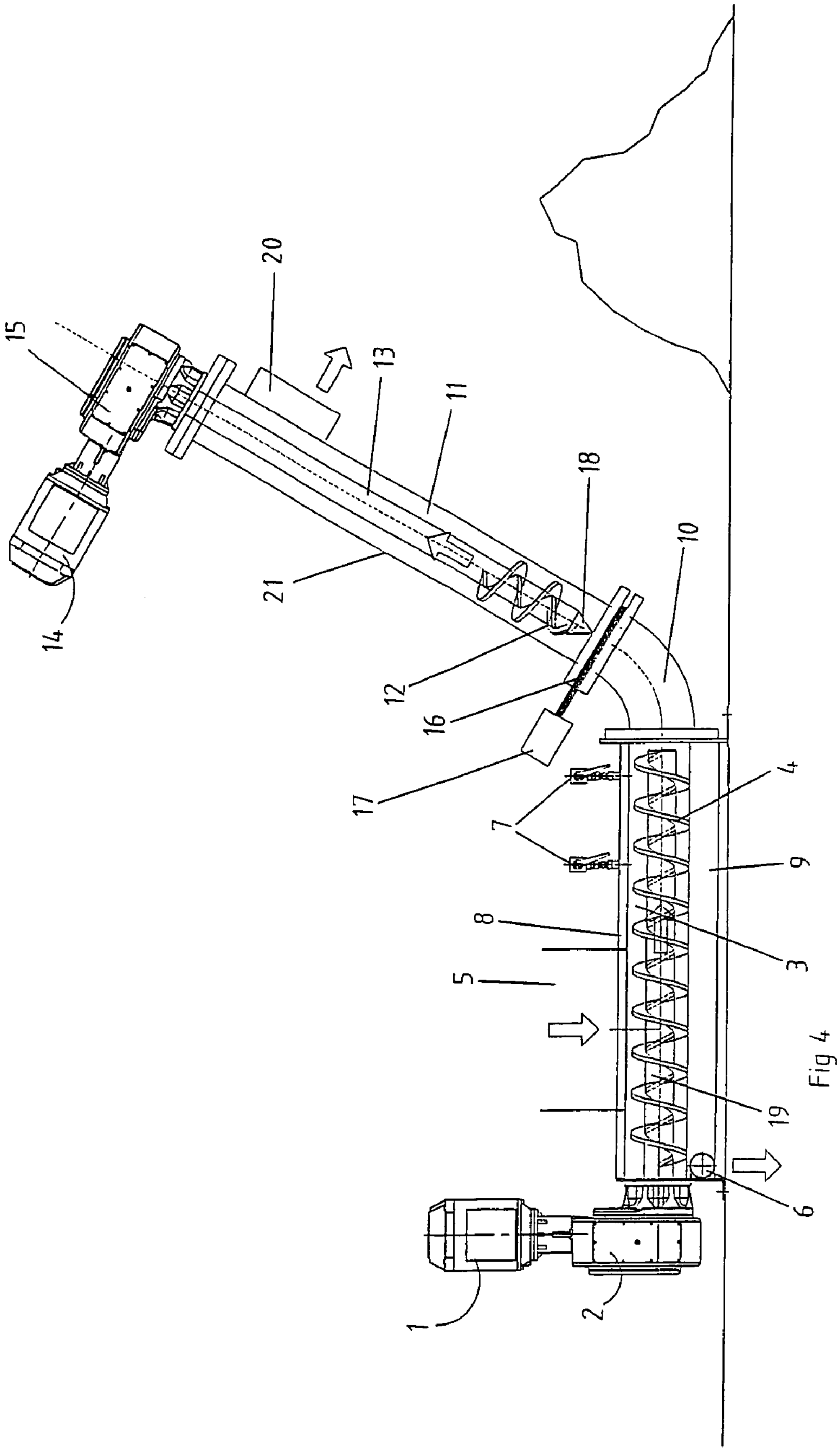
FIG. 4 is a general embodiment of the invention including a sludge dewatering press, a sludge compaction device, a sludge shredder and a tube conveyor for conveying shredded sludge.

FIG. 4 shows a general embodiment including a screw press 3, a compaction device 10 in the form of a tube bend connected to the screw press 3 downstream thereof and a tube conveyor 11 extending upwardly from the compaction device 10 and defining a channel for conveying sludge. Sludge to be dewatered is introduced into the press 3 through a feed inlet 5 and is transported and subjected to pressure by a press screw 4 attached to a shaft 19 driven by a press motor 1 via a gear 2. The press screw 4 rotates inside a cylinder of the press 3 having a water pervious wall 8. Wash water may be introduced into the cylinder of the press 3 through pipes 7 provided with valves. Water being pressed out of the sludge is collected in a trough 9 below the press screw 4 and discharged through a water outlet 6 of the trough 9. The sludge leaving the screw press 3 is further compacted and dewatered in the compaction device 10. An adjustable valve 16 is provided between the tube bend of the compaction device 10 and the tube conveyor 11. A manually or automatically operable control device 17 controls the valve 16 to provide a desired rate of flow of dewatered sludge out of the compaction device 10.

The tube conveyor 11 includes a tube 21, in which an axle 13 extends and is driven by a motor 14 via a gear 15 placed at the downstream end of the tube 21. At the upstream end of the tube 21 there is a screw-shaped shredder 12 attached to the axle 13. The shredder 12 has a conical tip 18 (see FIG. 6) attached to the end of the axle 13. The dewatered sludge leaving the compaction device 10 is first broken up by the conical tip 18 and then shredded by the shredder 12. The dewatered and shredded sludge is discharged from the tube conveyor 11 at its upper downstream end through a discharge opening 20.

Figure 5:
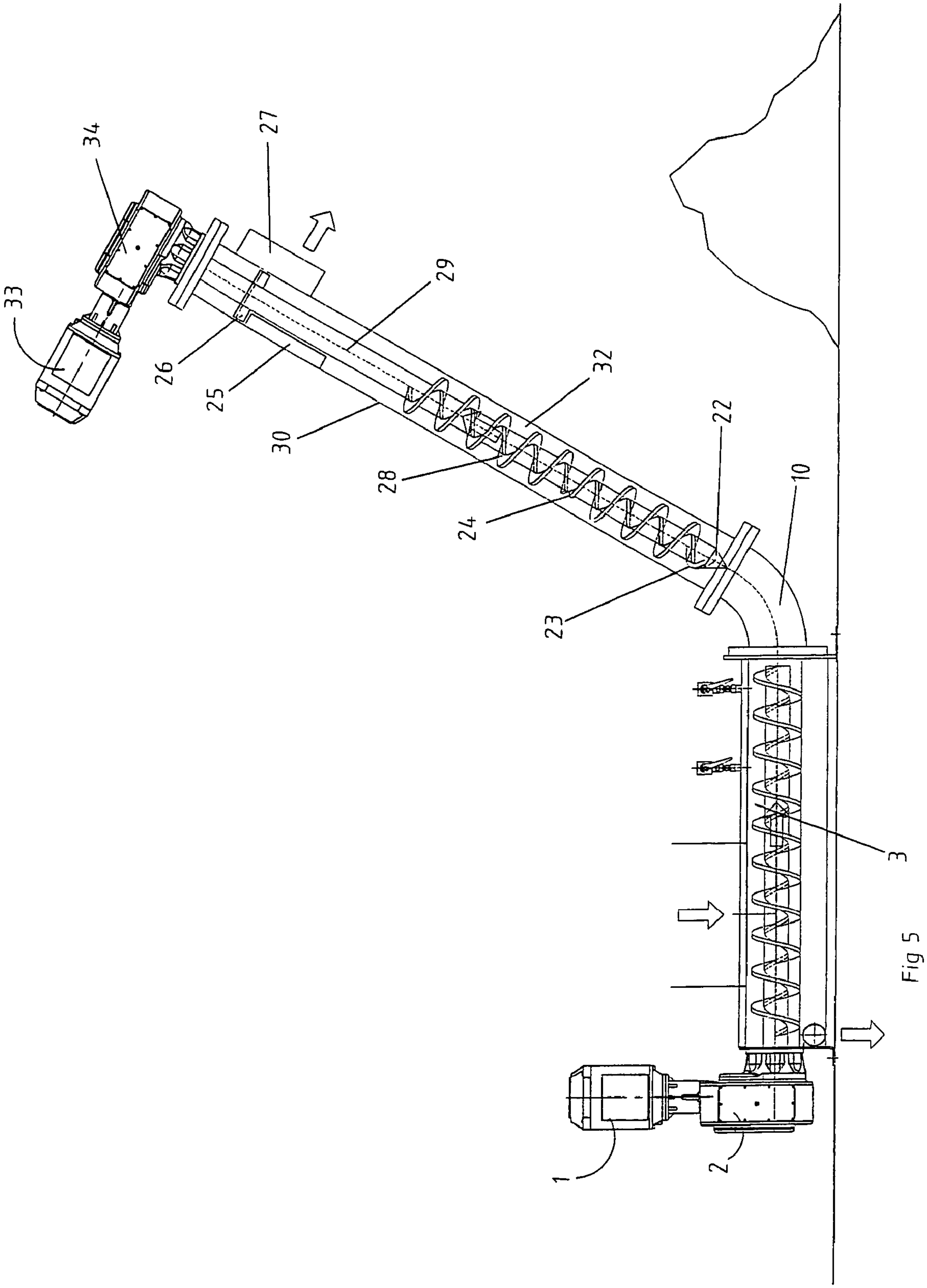
FIG. 5 is a modification of the general embodiment of FIG. 4.

FIG. 5 shows an embodiment similar to the embodiment of FIG. 4 except that it lacks an adjustable valve between the tube bend of the compaction device 10 and the tube conveyor, and that the tube conveyor is designed differently. Thus, in this embodiment the tube conveyor 32 includes an upwardly extending tube 30 and a helical transport screw 28 extending in the tube 30. Wear bars of hard material, not shown in FIG. 5, are placed on the inside of the tube 30. These bars, preferably three bars, center the transport screw 28 and prevent wear on the wall of tube 30, as well as enhance transport. It is also possible to substitute a core-less screw for the transport screw 28. The axle 29 is connected to a conveyor motor 33 via a gear 34. The dewatered sludge leaving the compaction device 10 enters the tube conveyor 32 axially at its upstream end, where it is first broken up by a conical tip 22 provided on the upstream end of the transport screw 28 and then directed to and shredded by the periphery 23 of the front end of the helical transport screw 28. The transport screw 28 transports the shredded, dewatered sludge up to the downstream end of the tube conveyor 32 where a discharge outlet 27 for dewatered sludge is provided remote from the transport screw 28. At least one additional shredder 24 may be arranged along the transport screw 28 of the tube conveyor 32. At the downstream upper end of the tube conveyor 32 there is provided a further shredding step including at least one rotary knife 26 attached to the axle 29 and at least one stationary elongate knife 25 attached to the tube 30. The rotary knife 26 is situated in front of the discharge outlet 27, whereas the elongate stationary knife 25 extends axially downwardly from the rotary knife 26 a distance past the lower edge of the discharge outlet 27. The knifes 25 and 26 ensure that clogging of sludge at the outlet 27 is prevented.

Figure 6:
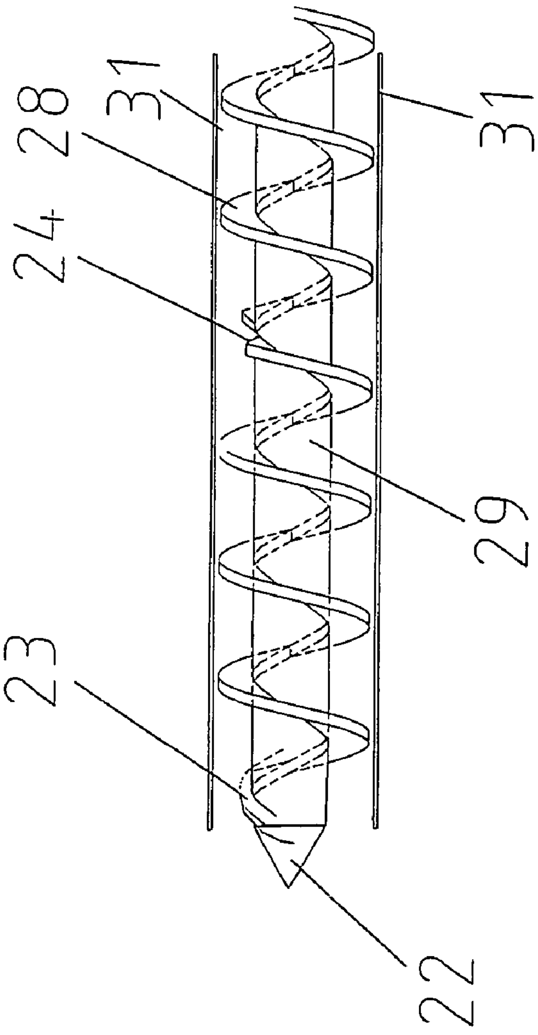
FIG. 6 shows a modification of the tube conveyor of the embodiment shown in FIG. 5, FIGS. 7-10 are four further modifications of the general embodiment of FIG. 4 provided with control systems.

FIG. 6 shows the upstream part of the transport screw 28 in more detail. The conical tip 22 attaches to the axle 29 and close to the tip 22 the transport screw 28 is provided with a helically extending element having a shredder 23 in the form of a peripheral edge. The radial extension of the peripheral edge of the shredder 23 is shorter than that of remaining portion of the transport screw 28. At least three hard material sticks 31, two of which are shown in FIG. 6, are provided on the inside wall of the tube 30, in order to center the transport screw 28 and prevent wear on the wall of tube 30, as well as enhance transport of dewatered sludge. One additional shredder 24 having an edge is shown on the transport screw 28 situated downstream of the shredder edge 23. The helically extending element of the transport screw 28 has a cut-away portion between the upstream and downstream ends of the transport screw 28, wherein the additional shredder 24 extends in the cut-away portion.

Figure 7:
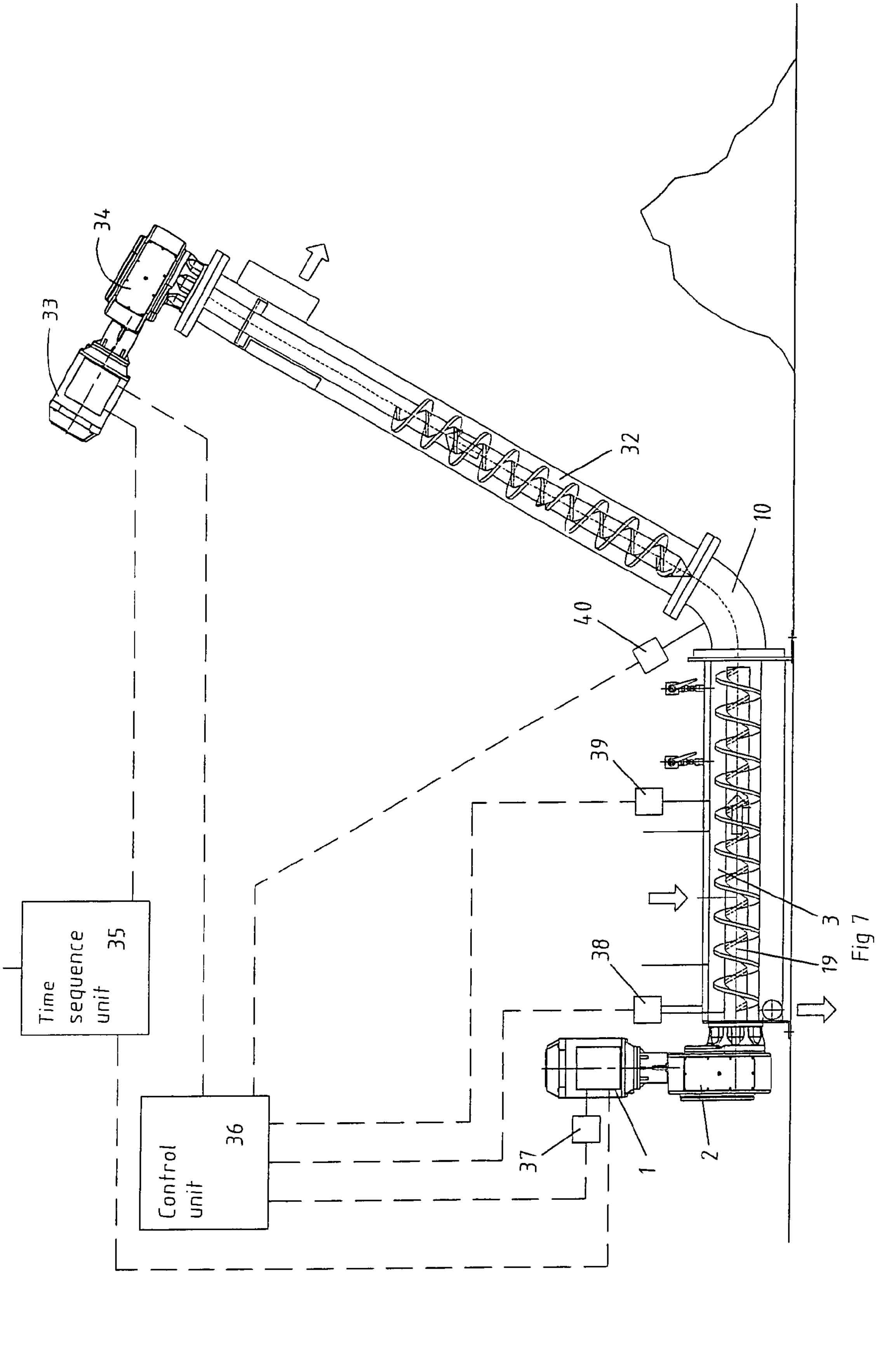

FIG. 7 shows the embodiment of FIG. 5 provided with control means. Thus, a control unit 36 of the control means controls the transport of sludge out of the screw press 3 and/or to or from the compaction device 10 and/or out of the tube screw conveyor 32 by controlling the conveyor motor 33 in response to signals from one or more of the following sensors. A sensor 37 provided on the press motor 1 gives a signal related to the momentary power for operating the press 3, a sensor 38 provided on the screw press 3 gives a signal related to the torque on the shaft 19 of the press screw 4, a sensor 39 also provided on the screw press 3 gives a signal related to the pressure and/or the concentration and/or the viscosity in/of the sludge in the screw press 3, a sensor 40 provided on the compaction device 10 gives a signal related to the sludge concentration and/or pressure and/or viscosity in the compaction device 10. A time sequence unit 35 of the control means controls the press motor 1 and/or the conveyor motor 33 to operate in cycles, so that they perform a programmed time sequence which may be initiated manually or by a signal through a signal line 41 from a process control computer (not shown) and/or originate from another source in the process upstream of the screw press 3. The time sequence unit 35 controls the press motor 1 and the conveyor motor 33 according to a predetermined time sequence unless overruled by signals from the control unit 36. The time sequence unit 35 may also be used to control the wash cycle in the screw press 3 in a known manner.

Figure 8:
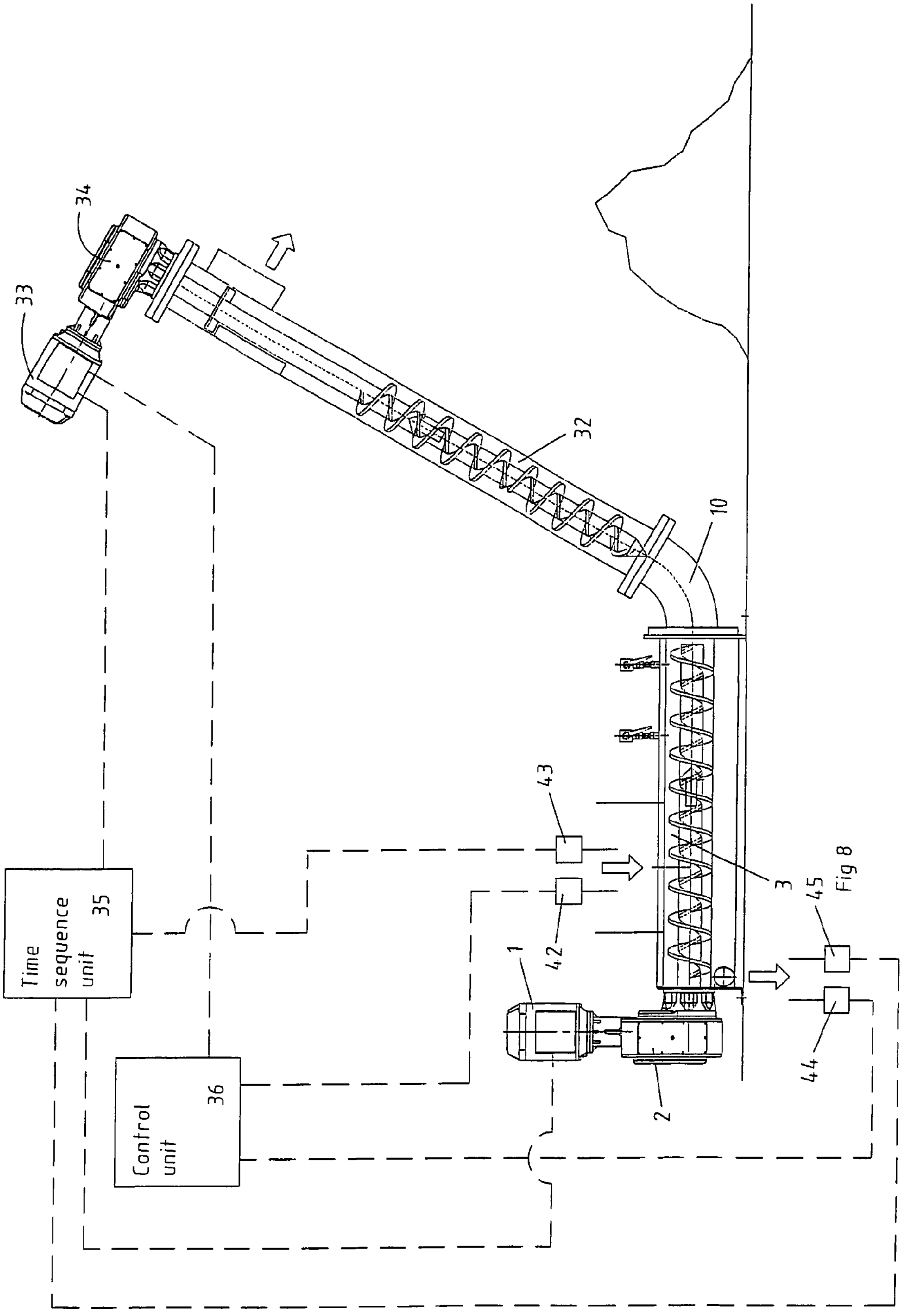

FIG. 8 shows the embodiment as described in FIG. 5 with added control means that differs from the control means of the embodiment shown in FIG. 7. Thus, the time sequence control unit 35 as described in FIG. 7 has sensors added, a first sensor 43 for sensing feed flow of the sludge that is supplied to the screw press 3 and a second sensor 45 for sensing water discharged through the water outlet 6. The time sequence unit 35 controls the press motor 1 and the conveyor motor 33 so that they perform a programmed time sequence, which may be initiated by a signal from sensor 43 indicating that the screw press 3 is receiving or has received sludge to be dewatered. The time sequence unit 35 can also control the feed flow to the screw press 3 in a manner known in the art although this is not shown in detail in FIG. 8. The programmed time sequence from unit 35 can be initiated or turned off by the sensor 45 sensing the flow of water out of the screw press 3 resulting from the dewatering of the sludge. For instance, the programmed time sequence may be turned off and/or re-initiated when the sensor 45 indicates that no more water is pressed out of the sludge.

The control unit 36 has sensors 42 and 44 connected for controlling the conveyor motor 33. Such control can be based on signals from the sensor 42 sensing the sludge feed flow to the screw press 3 and/or based on signals from the sensor 44 sensing the separated water flow discharged through the water outlet 6.

Figure 9:
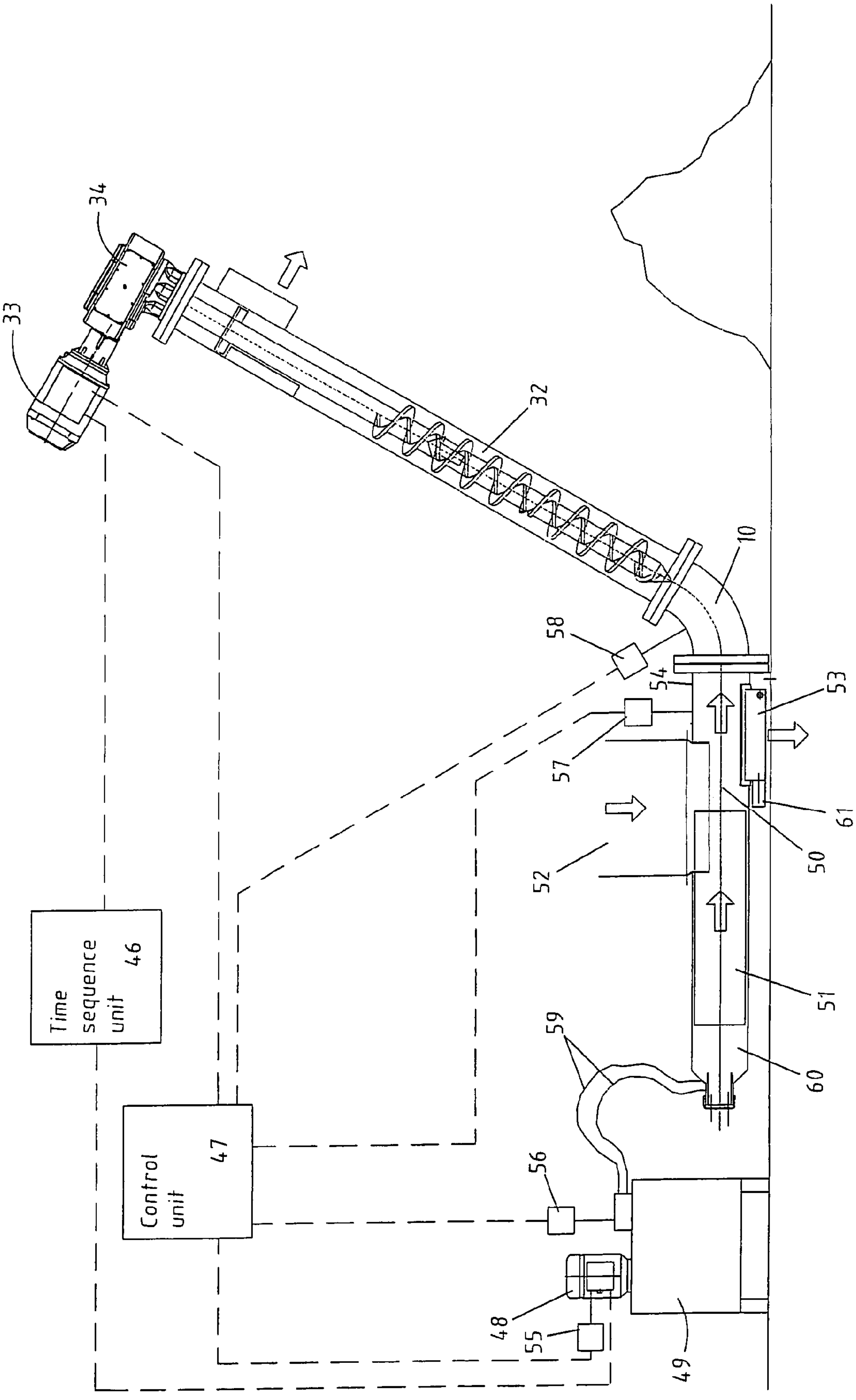

FIG. 9 shows an embodiment of the invention including a piston press 50 for dewatering sludge connected to the compaction device 10 and tube conveyor 32 as described above in connection with the embodiment according to FIG. 5. The piston press 50 is driven by a hydraulic or pneumatic press motor 48 connected to a hydraulic or pneumatic unit 49, in which a hydraulic or pneumatic pressure is produced and transmitted to the piston press 50 through pressure pipes 59. The piston press 50 has a piston press cylinder with a water pervious wall 54, in which a piston 51 moves in response to the pressure in a pressure chamber 60 provided through the pressure pipes 59. Sludge to be dewatered is introduced through a feed opening 52 and is compressed by the movement of the piston 51 as the pressure in the pressure chamber 60 is increased. Water is pressed out through the water pervious wall 54 of the piston press cylinder, is collected by a water collection plate 61 and is discharged through an opening 53. The dewatered sludge is pressed into the compaction device 10 where it is compacted and further dewatered. The dewatered and compacted sludge is then shredded and transported in the tube conveyor 32 as previously described.

Control means are provided and includes a control unit 47 that controls the transport of sludge out of the piston press 50 and/or to or from the compaction device 10 and/or out of the tube sconveyor 32 by controlling the conveyor motor 33 in response to signals from one or more of the following sensors. Thus, a first sensor 55 gives a signal related to the momentary power used by the press motor 48, a second sensor 56 gives a signal related to the pressure in the hydraulic or pneumatic unit 49, a third sensor 57 gives a signal related to the pressure and/or the concentration and/or the viscosity in/of the sludge in the piston press 50, and a sensor 58 gives a signal related to the sludge concentration and/or pressure and/or viscosity in the compaction device 10.

The control means further includes a time sequence unit 46 that controls the press motor 48 and the conveyor motor 33 so that they perform a programmed time sequence which may be initiated manually or by a signal from a process control computer and/or originate from another source in the process upstream of the piston press 50. The time sequence unit 46 controls the press motor 48 and the conveyor motor 33 according to a predetermined time sequence unless overruled by signals from the control unit 47. The time sequence unit 46 may also be used to control the wash cycle in the piston press 50 in a manner known per se.

Figure 10:
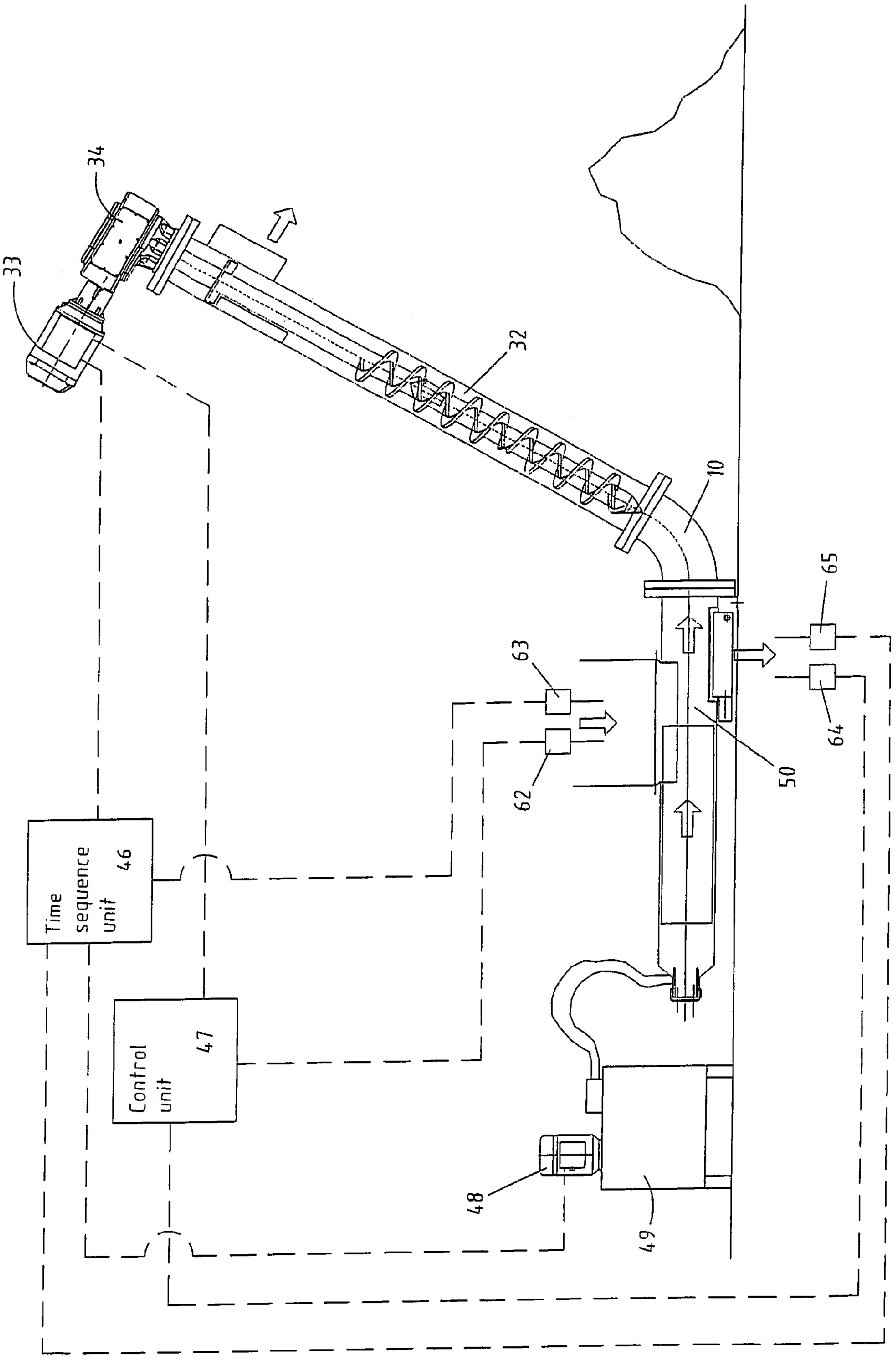

FIG. 10 shows an embodiment similar to the embodiment of FIG. 9 except that the control means are different. Thus, the time sequence control unit 46 has a first sensor 63 sensing feed flow of sludge supplied to the piston press 50 and a second sensor 65 sensing water being discharged through the opening 53. The time sequence unit 46 controls the press motor 48 and the conveyor motor 33 so that they perform a programmed time sequence, which may be initiated by a signal from sensor 63 indicating that the press 50 is receiving or has received sludge to be dewatered. The time sequence unit 46 can also control the feed flow to the press 50 in a manner known in the art although this is not shown in detail in FIG. 10. The programmed time sequence can be initiated or turned off by the sensor 65 sensing the flow of water out of the press 50 resulting from the dewatering. For instance, the programmed time sequence may be turned off and/or re-initiated when sensor 65 indicates that no more water is pressed out of the sludge.

The control unit 47 has a first sensor 62 and a second sensor 64 connected for controlling the conveyor motor 33. Such a control can be based on signals from the sensor 62 sensing the sludge feed flow supplied to the piston press 50 and/or the sensor 64 sensing the separated water flow discharged from the piston press 50.

Figure 11:
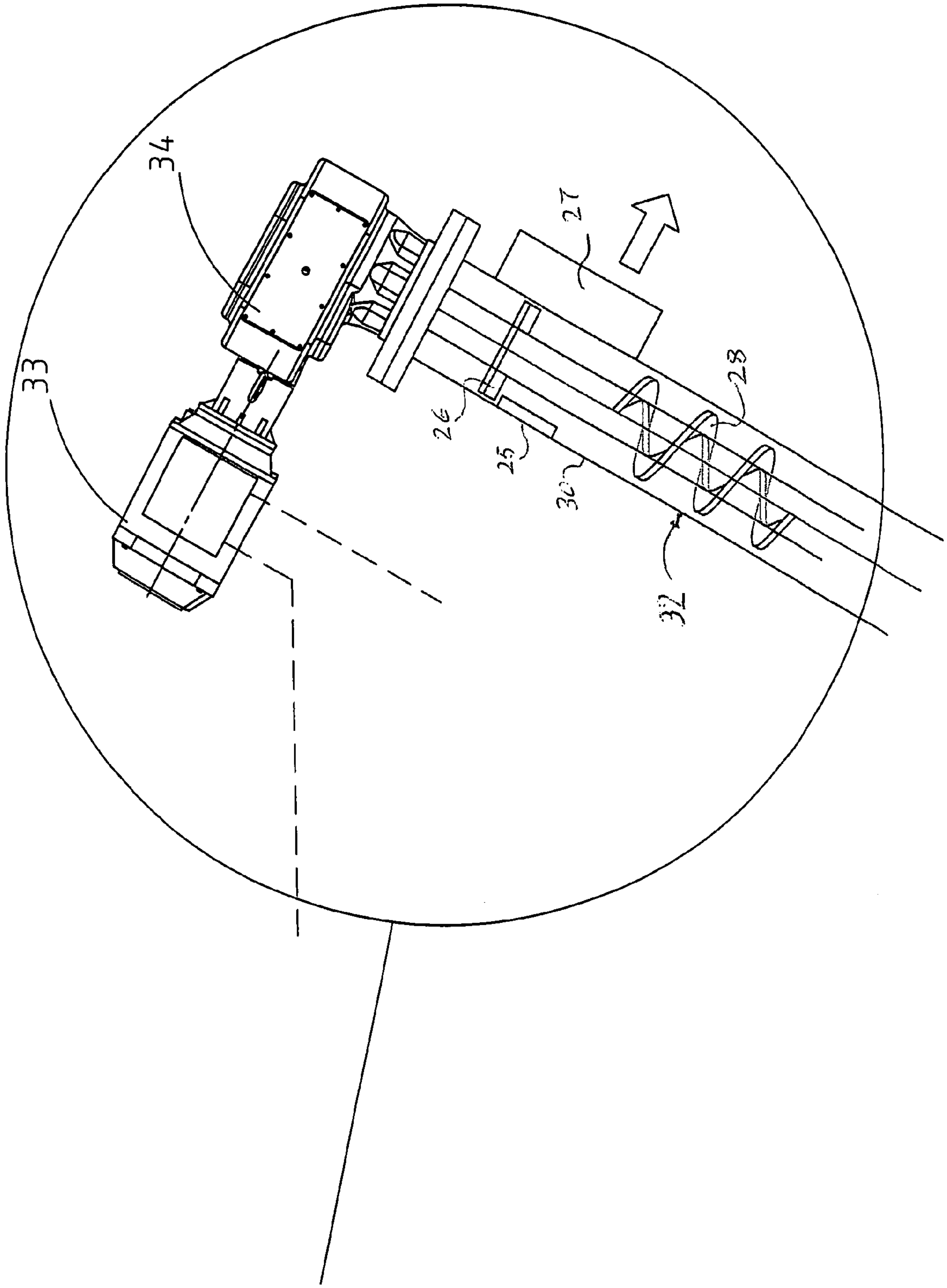
FIG. 11 shows a modification of the tube conveyor of the embodiments shown in FIGS. 7-10.

FIG. 11 shows a modification of the tube conveyor 32. Thus, the transport screw 28 extends in the tube 30 all the way up to the lower edge of the discharge outlet 27, and both the rotary knife 26 and the stationary knife 25 are located so that they face the discharge outlet 27. Of course, the stationary knife 25 is positioned relative to the discharge outlet such that it does not extend axially beyond the latter, in order not to interfere with the transport screw 28. Therefore, the stationary knife 25 is in this modification designed somewhat shorter than in the embodiments according to FIGS. 5-10

The various control and time sequence units described above can be applied in any of the above embodiments of the invention.

The apparatus of the present invention has been tested. At the test a dry solids concentration of 54% in the dewatered sludge was obtained. In contrast, dewatering of sludge in a conventional apparatus for treating sludge gives a dry solids concentration of maximum 40-45%. Furthermore, the sludge dewatered by the apparatus of the invention can be transported by the tube conveyor eight to ten meters vertically versus maximum three meters with a conventional sludge treatment apparatus.

In the embodiments according to FIGS. 5 to 10 operational parameters relating to the press are measured and a signal based on the measured parameters is used for controlling the flow rate of sludge through the press and/or compaction device and/or tube conveyor. In addition, it is also possible according to the invention to alternatively measure operational parameters related to the tube conveyor/and or shredder and use the signals resulted from these measured parameters to control the operation of the press. As an example the momentary power consumption of the conveyor motor and/or shredder motor and/or torque of the transport screw axle can be measured to produce a signal which can be used to control the flow of sludge to the press and/or the speed of the press motor and/or be used to overrule the signal from the time sequence unit.

What is claimed is:

1. A method for treating sludge, comprising the steps of:

providing a press and operating the press to dewater the sludge, providing a compaction device and operating the compaction device to compact the dewatered sludge, providing a shredder and operating the shredder to shred the compacted sludge, controlling the operation of the shredder in response to at least one sensed operational parameter of the press and/or at least one operational parameter of the compaction device, providing a transport screw in a closed channel and rotating the transport screw to transport the shredded sludge in the closed channel, controlling the transport screw in response to at least one sensed operational parameter of the press, and discharging the sludge from the channel.

2. A method as claimed in claim 1, further comprising shredding the sludge at least once more as the sludge is transported in the channel.

3. A method as claimed in claim 1, further comprising shredding the sludge once more just before the sludge is discharged from the channel.

4. A method as claimed in claim 1, further comprising washing the sludge at the same time as it is dewatered.

5. A method as claimed in claim 4, wherein the sludge is washed in cycles.

6. A method as claimed in clam 1, further comprising controlling the press to transport the sludge at a controlled flow rate to or from the compaction device.

7. A method as claimed in claim 6, further comprising controlling the press to vary the flow rate of the sludge in response to the operational parameter of the press.

8. A method as claimed in claim 1, wherein the operational parameter of the press comprises the momentary power for operating the press, pressure in the sludge in the press, sludge concentration in the press, sludge feed flow to the press or separated water flow from the press.

9. A method as claimed in claim 1, wherein the press comprises a press motor for driving it and the operational parameter comprises the momentary power consumption of the press motor.

10. A method as claimed in claim 9, wherein the press comprises a press screw and a drive shaft connecting the motor and press screw, and the operational parameter of the press comprises the torque of the drive shaft.

11. A method as claimed in claim 1, further comprising controlling the press to vary the flow rate of the sludge in response to the operational parameter of the compaction device.

12. A method as claimed in claim 11, wherein the operational parameter of the compaction device comprises the pressure in the sludge in the compaction device, or sludge concentration in the compaction device.

13. A method as claimed in claim 1, wherein the operational parameter of the compaction device comprises the pressure in the sludge in the compaction device, or sludge concentration in the compaction device.

14. A method as claimed in claim 1, wherein the rotational speed of the transport screw is controlled in response to the operational parameter of the press.

15. A method as claimed in claim 1, further comprising controlling the press to operate in cycles.

16. A method as claimed in claim 1, further comprising controlling the shredder and/or transport screw to operate in cycles.

17. A method as claimed in claim 1, wherein the transport screw is adapted to convey the shredded sludge in a direction upwardly from the shredder and the sludge is discharged from the channel in a position above the shredder.

* * * * *